United States Patent

Faunce

[11] 4,052,867
[45] Oct. 11, 1977

[54] LOCKING SECURITY FRAME

[76] Inventor: John Ray Faunce, Gruver & Ervin Roads, Pipersville, Pa. 18947

[21] Appl. No.: 710,713

[22] Filed: Aug. 2, 1976

[51] Int. Cl.² .......................................... E05B 73/00
[52] U.S. Cl. ................................. 70/58; 70/DIG. 57
[58] Field of Search ............ 70/57, 58, 258, DIG. 57; 248/203; 232/6

[56] References Cited

U.S. PATENT DOCUMENTS

| | | | |
|---|---|---|---|
| 3,410,122 | 11/1968 | Moses | 70/58 |
| 3,595,041 | 7/1971 | Leeper | 248/203 X |
| 3,945,227 | 3/1976 | Reiland | 70/58 |

Primary Examiner—Robert L. Wolfe

[57] ABSTRACT

The four sides of a security frame for radios are of channel construction to enclose the fastening means, and three of the sides are hinged together, the fourth side being lockable in place to enclose the radio.

5 Claims, 5 Drawing Figures

U.S. Patent     Oct. 11, 1977     4,052,867
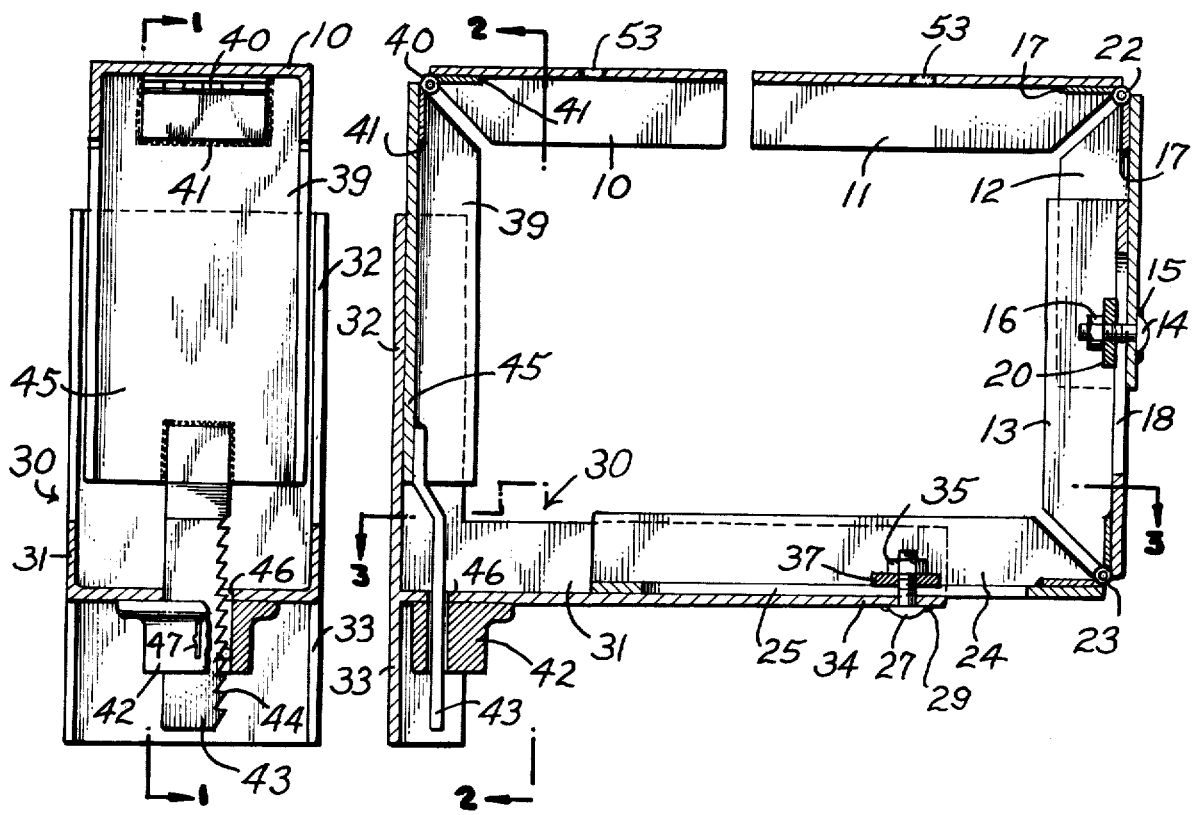
FIG.1
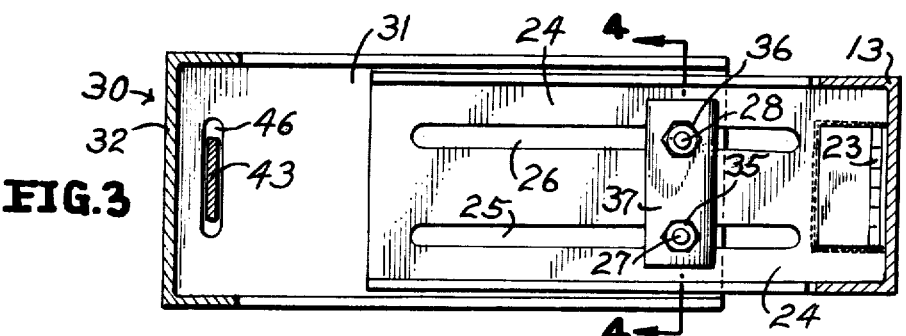
FIG.2
FIG.3
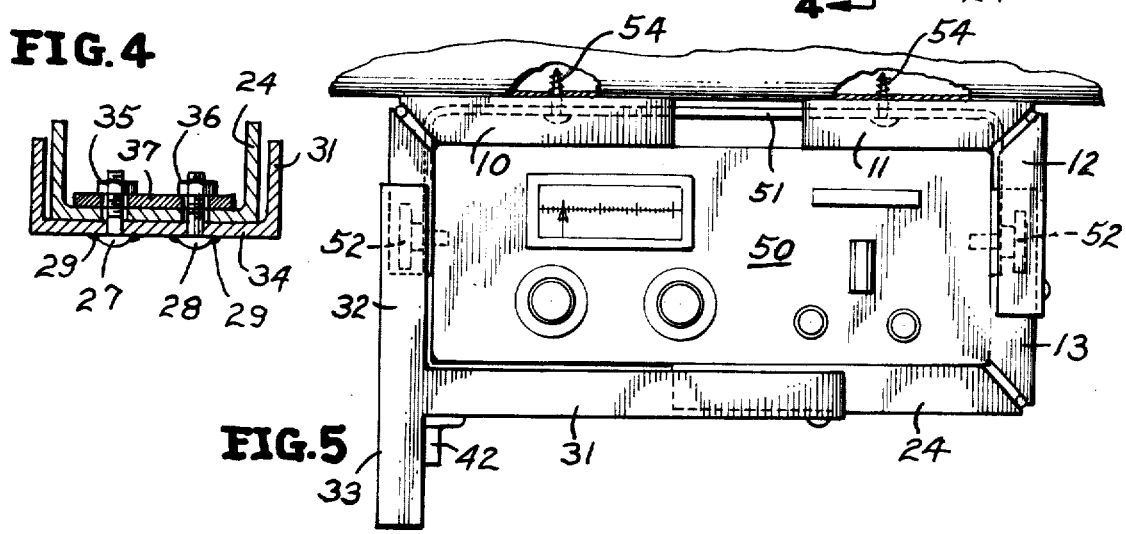
FIG.4
FIG.5

LOCKING SECURITY FRAME

This invention relates to a security, locking frame for electronic sets and particularly to an anti-theft attachment for holding a citizen band radio set and the like, in automobiles or boats.

Citizen band radios are being installed in automobiles at a vastly increasing rate because they enable mobile communication between the driver or passenger and a base station or another mobile station. They make it possible for a person, at all locations along a road, to inquire about travel directions and weather conditions, or to report an accident or mechanical failure or to ask directly for repair assistance, for example. As the sets are quire expensive and as there is a great demand for them, more and more of them are being stolen from automobiles. The manner in which they are ordinarily fastened in an automobile makes it possible for a thief to remove them in several minutes.

Their location in an automobile makes them obvious to a would-be thief. Ordinarily, they are located within easy reach of the driver so that he can make a quick adjustment of it but unfortunately this places it in full view of a person who is looking in automobiles to see if there is one to be stolen. They are almost always an added accessory and are not built into the automobile as is the conventional radio set and their open availability makes it relatively easy to remove them.

The security frame of the present invention provides a means for locking the citizens band set in any one of the accustomed places. The frame embraces the set to hold it against removal and additionally it encloses or overlies the bolts or screws which attach the set to the security frame and which also attach the frame to the automobile.

The locking frame can be used to prevent theft of citizen band, ham and business radios as well as ordinary broadcast radios and tape recorders. It can be used in automobiles, trucks, boats, and in offices and stores which are open to the public and where a theft of the set might occur.

A preferred embodiment of the locking frame of the invention is illustrated in the drawings, in which, FIG. 1 is a front elevational view, the front flange of the framework being omitted as indicated by the section line 1—1 of FIG. 2, FIG. 2 is a sectional view on the line 2—2 of FIG. 1, of the inside end face, FIG. 3 is a sectional view on the line 3—3 of FIG. 1, FIG. 4 is a sectional view on the line 4—4 of FIG. 3 the parts of the structure to the rear of the section being omitted, and FIG. 5 is a front elevational view showing how the frame encloses a CB set and its attached handle or bracket.

In general, the locking frame is a four sided, open framework which is adjustable in size so that it can be closed in firmly on the four sides of an electronic set or instrument which is shown here as a citizens band radio. Each of the four sides of the frame is made of two pieces that can be moved apart or closer to each other so that any size instrument can be accommodated and the sides can be fixed in that position to prevent removal of the instrument. One of the sides is fixed in this position by a lock which can readily be unlocked to permit removal of the instrument.

The top side of the frame includes the two pieces 10 and 11 which lie against the bracket on the top side of the instrument. These two pieces are to be bolted or screwed to the dash of an automobile at a fixed distance apart corresponding to the width of the instrument, as will be explained. As is shown in FIG. 2 the pieces 10 and 11 are channels in cross section with the channel opening inwardly of the frame. This channel provides a strong structure which resists bending and the channel also encloses the instrument handle or bracket as will be explained.

The right hand end wall of the frame, as seen in FIG. 1, is made up of the two pieces 12 and 13, both being of channelled cross section. The upper piece 12 is just large enough to receive the lower piece 13 so that they interfit but can slide endwise, relative to each other. The upper piece 12 could, just as well, be smaller in cross section than the lower piece 13 so that it fits within the walls of the lower piece 13, as this would permit the extension or shortening of the end wall constituted by the pieces 12 and 13.

To firmly hold the pieces 12 and 13 in a fixed relative position two side by side bolts one of which is 14, and their nuts are provided, the front nut 16 being shown. The heads of the bolts 14 are welded at 15 to the upper piece 12 so that they cannot be turned. The bolts pass through the upper piece 12 and through respective lengthwise slots of the lower piece 13, the front slot 18 being shown. The nut 16 can be screwed on tightly against the inner face of the lower piece 13 but it is preferred that the clamping plate 20 be interposed between the nuts and the piece 13 and that both of the bolts 14 pass through it. This provides a tighter frictional grip.

The upper piece 12 is pivoted to the top piece 11 by a hinge 22 and its hinge plates are preferably welded as at 17 separately to the pieces 11 and 12 to prevent their removal. The hinge plates could, just as well, be riveted or otherwise be affixed to the channels so that the hinge cannot be removed. The pin of the hinge 22 should be welded or otherwise be affixed in place so that it cannot be removed.

The lower piece 13 is attached by a hinge 23 to a bottom piece 24 which structurally is preferably a duplicate of the lower piece 13. The hinge 23 preferably is a duplicate of the hinge 22 to reduce expense and the two plates of hinge 23 are welded or otherwise non-removably affixed to the frame pieces 13 and 24. The lower piece 24 has the two parallel longitudinal slots 25 and 26 in it, corresponding to the slots 18 in channel 13, to receive the fastening bolts 27 and 28. These fastening bolts 27 and 28 are side by side, such as the bolts at 14.

These bolts 27 and 28 are welded at 29 to a T shaped bottom frame piece 30. This T frame includes the channeled stem section 31 and the channelled end section which has an upwardly extending portion 32 and a downwardly extending portion 33. The end section, made up of the portions 32 and 33, is at right angles to the stem section 31. The stem section has the face plate 34 to which the fastening bolts 27 and 28 are welded or non-removably affixed. This T shaped frame is preferably welded together out of separate pieces so that a unitary construction results and because these separate pieces may be put together in several different ways which will be apparent, the details are not shown here.

The channeled stem section 31 is of a size to snugly and slidably receive the channeled bottom frame piece 24. The section 31 could, of course be of a smaller cross section size so that it fits in the channel of bottom piece 24 and in this case the bolts 27 and 28 would be welded to the piece 24 and the slots 25 and 26 would be in the face plate 34, so that a reverse arrangement of that shown would be constructed. In the illustrated structure, nuts 35 and 36 (like the nuts at 16) on the bolts 27 and 28 secure an attachment plate 37 like plate 20.

Slidably fitting within the upper portion 32 of the T shaped section 30 is a channeled, upper left-hand end piece 39. This frame piece 39 is pivotally attached by the hinge 40 to the top frame piece 10. The hinge plates are respectively welded as at 41 to top frame piece 10 and the upper side frame piece 39 and the hinge pin is welded against removal so that these frame pieces cannot be broken apart.

To provide for the lengthwise adjustment of the frame piece 39 relative to the portion 32 of the T shaped frame member 30 and also secure them together, a lock 42 and a lock stem 43 serve this purpose and releasibly lock these frame pieces together. The lock stem 43 has a serrated or saw-toothed edge at 44 and the stem is welded or riveted to the base or face plate 45 of the upper frame piece 39. This stem extends downwardly through a hole 46 through the base or face plate 34.

The lock 42 is moved upwardly from the free end of the stem 43 until the electrical instrument is clamped between the top frame piece 10 and the section 31 of the T shaped frame member. The engagement of the lock pin (not shown) in the lock 42 against the adjacent one of the teeth 44 prevents removal of the lock 42. The lock 42 can be removed so that the frame can be opened up, only if the proper key is inserted in the keyway 47 of the lock. As the lock stem 43 and the lock 42 are are commercially available and are conventionally used to lock the sliding doors of show cases, the details of their construction need not be set forth.

The depending portion 33 of the T shaped member 30 partially surrounds the stem 43 and the lock 42 so that they cannot easily be tampered with. This portion 33 may, of course, be omitted but it serves the useful purpose of shielding the lock to thereby discourage attempts to remove the secured instrument.

The frame is readily adapted to any electronic instrument which is generally installed in an automobile. These instruments are sold with a handle or attachment bracket which is intended to be fastened to the lower edge of the dash board. FIG. 5 shows a representative instrument 50 and an attachment bracket 51 which is fastened at its ends to the opposite sides of the instrument, by bolts 52. The top part of the bracket 51 has holes through it so that bolts or screws can pass through the holes and be attached to the dash board.

In using the present frame, the set of instrument with its attachment bracket 51 is placed with the frame, the nuts 16, 35 and 36 being loose, and the frame is collapsed against the set. Holes 53 are then located and bored through the base of each frame piece 10 and 11 corresponding to the location of the holes through the bracket 51; then the screws or bolts 54 are applied to attach the bracket 51 and the frame pieces 10 and 11 to the automobile structure. It may be necessary to temporarily remove the bolts 52 to accomplish this.

The end frame pieces 12 and 13 are contracted to the heighth of the instrument and the nuts 16 are firmly tightened. Then the bottom frame piece 24 and the T shaped member are contracted to the width of the instrument and the nuts 35 and 36 are firmly tightened. The hinges 22, 23 and 40 permit the frame to be opened up so that the instrument can be inserted in place and the instrument is fastened by the bolts 52 to the ends of the bracket 51. Then the frame is swung closed about the hinges so that the lock stem 43 passes through the hole 46. When the lock 42 is pushed as far as it will go up on the stem 43 the instrument is safely secured in place.

Because of the channels of frame pieces 10 and 11 it is impossible to unscrew the screws or bolts 54. Nor is it possible to unscrew the bolts 52 as they lie within the channels at the sides of the instrument and access cannot be had to them. The instrument 50 and the channels of the frame prevent loosening nuts 16, 35 and 36. The lock 42 firmly holds all parts of the frame close to the instrument so that it cannot be removed in any direction.

The instrument is easily removed; after the lock 42 is removed the T shaped member is dropped down about hinge 23. The left hand upper end piece 39 is swung away about hinge 40 and the bolt 52 so exposed is unscrewed and removed. The right hand frame pieces 12 and 13 are swung away about hinge 22 and the other bolt 52 so exposed is unscrewed and removed and the instrument is removed by moving it forwardly or dropping it down out of the open frame.

An advantage of the locking frame is that it can inexpensively be made as the channels are standard items or can easily be made in a bending machine. The bolts and nuts and the hinges are commercial items and as has been stated the lock and its lock stem are readily obtainable.

I claim

1. A locking security frame comprising four frame sides defining an open center which will receive a four sided article to be secured against theft, each side frame including two parts which are adjustable lengthwise of each other to fit the size of the article, said parts being of channeled cross section with the opening facing inwardly of the frame, the two channel parts at one side frame being disposed to enclose and prevent access to the means used to attach the article to a fixed body, the two channel parts at each of the other three side frames having a sliding fit within each other so that they telescope relative to each other, and releasible securing means for retaining the two parts of each of said three side frames in a fixed lengthwise position, said channelled parts of said other three side frames serving to enclose said releasible securing means and thereby preventing access to said securing means to prevent their release.

2. The frame of claim 1 in which said releasible securing means includes bolts which pass through slots which are lengthwise of the parts which are retained together, the heads of the bolts being permanently affixed to the outside of the frame and their nuts being on the inner side of the channel, said lengthwise slots permitting lengthwise adjustment of the parts to be secured together.

3. The frame of claim 1 in which said releasible securing means includes a lock and a lock stem, the lock stem being permanently affixed to one part of a side frame and passing through a hole in the other part of that side frame, and said lock being attachable to said lock stem on the outside of and against the frame.

4. A locking security frame comprising four frame sides defining an open center which will receive a four sided article to be secured against theft, each side frame including two parts which are adjustable lengthwise of each other to fit the size of the article, said parts being of channelled cross section with the opening facing inwardly of the frame, and releasible securing means for retaining the two parts of each side frame in a fixed lengthwise position, said channelled parts preventing access to at least some of said securing means to prevent their release and in which there are attached hinges at three of the corners of the frame and at the fourth corner is an angular member one side of which constitutes a part of one side frame and the other side of which constitutes a part of another side frame which meet at said fourth corner.

5. The frame of claim 4 in which said angular member is of T shape the third side of which encloses a securing means.

* * * * *